United States Patent
Wu

(10) Patent No.: US 11,741,678 B2
(45) Date of Patent: Aug. 29, 2023

(54) VIRTUAL OBJECT CONSTRUCTION METHOD, APPARATUS AND STORAGE MEDIUM

(71) Applicant: QINGDAO PICO TECHNOLOGY CO., LTD., Shandong (CN)

(72) Inventor: Tao Wu, Shandong (CN)

(73) Assignee: QINGDAO PICO TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 17/817,647

(22) Filed: Aug. 4, 2022

(65) Prior Publication Data
US 2022/0375179 A1    Nov. 24, 2022

Related U.S. Application Data

(63) Continuation of application No. PCT/CN2021/118548, filed on Sep. 15, 2021.

(30) Foreign Application Priority Data

Apr. 13, 2021    (CN) .......................... 202110393913.4

(51) Int. Cl.
*G06T 19/00*    (2011.01)
*G06T 7/593*    (2017.01)
(Continued)

(52) U.S. Cl.
CPC ............ *G06T 19/006* (2013.01); *G06F 18/23* (2023.01); *G06T 7/593* (2017.01); *G06T 7/70* (2017.01);
(Continued)

(58) Field of Classification Search
None
See application file for complete search history.

(56) References Cited

U.S. PATENT DOCUMENTS 6,420,698 B1 * 7/2002 Dimsdale ............ G01C 15/002
                                                    250/234
10,593,120 B1    3/2020 Oliver
(Continued)

FOREIGN PATENT DOCUMENTS

CN        102682477 A    9/2012
CN        103500340 A    1/2014
(Continued)

OTHER PUBLICATIONS

Sudipta N. Sinha, Drew Steedly, Richard Szeliski, Maneesh Agrawala, "Interactive 3D Architectural Modeling from Unordered Photo Collections", 2008, SIGGRAPH Asia '08: ACM SIGGRAPH Asia 2008 Papers, 159:1-10, https://doi.org/10.1145/1457515.1409112 (Year: 2008).*

(Continued)

*Primary Examiner* — Michael J Cobb

(57) ABSTRACT

The present disclosure relates to a virtual object construction method and apparatus, and the method includes: obtaining a plurality of first planes on a target object in an environmental image according to an acquired environmental image; obtaining a plurality of corner points according to the plurality of first planes; constructing a virtual object corresponding to the target object according to a corner point located on the target object in the plurality of corner points.

17 Claims, 3 Drawing Sheets

| Obtaining a plurality of first planes on a target object in an environmental image according to an acquired environmental image | S210 |

| Obtaining a plurality of corner points according to the plurality of first planes | S220 |

| Constructing a virtual object corresponding to the target object according to a corner point located on the target object in the plurality of corner points | S230 |

(51) Int. Cl.

| | |
|---|---|
| *G06T 7/70* | (2017.01) |
| *G06V 20/64* | (2022.01) |
| *G06T 17/00* | (2006.01) |
| *G06V 10/762* | (2022.01) |
| *G06V 10/74* | (2022.01) |
| *G06V 10/764* | (2022.01) |
| *G06T 17/20* | (2006.01) |
| *G06F 18/23* | (2023.01) |

(52) U.S. Cl.
CPC ............ *G06T 17/00* (2013.01); *G06T 17/205* (2013.01); *G06V 10/761* (2022.01); *G06V 10/762* (2022.01); *G06V 10/764* (2022.01); *G06V 20/64* (2022.01); *G06T 2207/10012* (2013.01)

(56) References Cited

U.S. PATENT DOCUMENTS

| | | | |
|---|---|---|---|
| 11,348,269 B1* | 5/2022 | Ebrahimi Afrouzi | G06V 20/56 |
| 2002/0059042 A1* | 5/2002 | Kacyra | G01S 7/4817 |
| | | | 702/152 |
| 2019/0051054 A1* | 2/2019 | Jovanovic | G06T 17/00 |
| 2021/0004630 A1* | 1/2021 | Uscinski | G06T 17/00 |
| 2021/0279950 A1* | 9/2021 | Phalak | G06V 10/40 |
| 2022/0156426 A1* | 5/2022 | Ham | G06F 30/13 |
| 2022/0224833 A1* | 7/2022 | Cier | H04N 5/23238 |
| 2022/0358694 A1* | 11/2022 | Zhang | G06T 7/60 |

FOREIGN PATENT DOCUMENTS

| | | |
|---|---|---|
| CN | 105139416 A | 12/2015 |
| CN | 109544677 A | 3/2019 |
| CN | 109584375 A | 4/2019 |
| CN | 110163064 A | 8/2019 |
| CN | 110852323 A | 2/2020 |
| CN | 111178127 A | 5/2020 |
| CN | 111784765 A | 10/2020 |
| CN | 112017300 A | 12/2020 |
| CN | 113240789 A | 8/2021 |

OTHER PUBLICATIONS

Search Report dated Jan. 17, 2022 for PCT Application No. PCT/CN2021/118548.
Second Office Action dated Feb. 11, 2023 in corresponding CN Application No. 202110393913.4, with English translation (25 pages).
Ji Zhao et al., "The Nurbs Surface Reconstruction for the Turbine Blade Scatted Points Based on FEM," China Manufacturing Information, vol. 35, No. 1, Published Jan. 31, 2006, with English translation of Abstract only (5 pages).
Office Action dated Aug. 2, 2022 in corresponding CN Application No. 202110393913.4, English translation (21 pages).
Tingwei, D., "Kinect Depth Data Segmentation Based on Gaussian Mixture Model Clustering," College of Computer Beijing University of Technology, vol. 31, No. 12, Dec. 2014, English translation of Abstract only, (5 pages).

* cited by examiner

VIRTUAL OBJECT CONSTRUCTION METHOD, APPARATUS AND STORAGE MEDIUM

The present disclosure claims the priority of a Chinese patent application filed with the NATIONAL INTELLECTUAL PROPERTY ADMINISTRATION, PRC on Apr. 13, 2021, application No. 202110393913.4 and entitled "VIRTUAL OBJECT CONSTRUCTION METHOD AND APPARATUS", and the entire contents of which are incorporated herein by reference.

TECHNICAL FIELD

The embodiments of the disclosure relate to the technical field of electricity, in particular to a virtual object construction method, a virtual object construction apparatus and a storage medium.

BACKGROUND

A computer can control a user interface to create an Extended Reality (XR) environment. Part of or all of the extended reality environment perceived by the user is generated by the computer using data describing the environment, and the data is presented to the user through the user interface, so that the user can experience the virtual object constructed accordingly.

Therefore, it is necessary to provide a method of creating a virtual object.

SUMMARY

An object of the embodiments of the present disclosure is to provide a new technical solution of constructing a virtual object. According to a first aspect of the present disclosure, provided is a virtual object construction method including: obtaining a plurality of first planes on a target object in an environmental image according to an acquired environmental image; obtaining a plurality of corner points according to the plurality of first planes; constructing a virtual object corresponding to the target object according to a corner point located on the target object in the plurality of corner points.

In an embodiment, the obtaining a plurality of first planes on a target object in an environmental image according to an acquired environmental image includes: obtaining depth information of points on the target object in the environmental image according to the acquired environmental image; and obtaining the plurality of first planes on the target object according to the depth information of points on the target object.

In an embodiment, the obtaining the plurality of first planes on the target object according to the depth information of points on the target object includes: acquiring a plurality of second planes on the target object according to the depth information of points on the target object; generating a normal of each of the second planes; clustering the plurality of second planes according to the normal of each of the second planes to obtain a set number of multitype second planes; obtaining the plurality of first planes on the target object according to the multitype second planes, and the multitype second planes corresponding to the plurality of first planes one to one.

In an embodiment, the clustering the plurality of second planes according to the normal of each of the second planes to obtain a set number of multitype second planes includes: acquiring a set number of a plurality of first clustering centers, the plurality of first clustering centers being a plurality of lines; calculating, for each of the second plane, clustering values of the second plane and each of the first clustering centers correspondingly according to a relative position relationship between the normal of the second plane and each of the first clustering centers, and classifying the second planes into the first clustering center with the largest clustering value; performing weighted average processing, for each of the first clustering centers, on the normal of each of the second planes classified to the first clustering center, and using a line obtained by the processing as a corresponding second clustering center; generating a similarity between the first clustering center and the corresponding second clustering center; comparing the similarity with a set similarity threshold; using each of obtained second clustering centers as a corresponding first clustering center in a case where any generated similarity is less than the similarity threshold, and executing the step of calculating the clustering value of the second plane and each of the first clustering centers; and using respective second planes classified into the same first clustering center as one-type second planes in a case where each of the generated similarities is not less than the similarity threshold, to obtain the set number of multitype second planes.

In an embodiment, the obtaining a plurality of corner points according to the plurality of first planes includes: acquiring an intersection line of the two first planes in an infinitely extended state, for any two first planes in the plurality of first planes; and using an intersection point of other first planes and the intersection line as one corner point to obtain a plurality of corner points, for any other first plane in the plurality of first planes intersecting the intersection line in the infinitely extended state.

In an embodiment, before the constructing a virtual object corresponding to the target object, the method further includes: acquiring three other corner points relatively closer to the target corner point in the plurality of corner points by using any corner point in the plurality of corner points as a target corner point; obtaining two triangles according to the target corner point and the three other corner points, three vertices of the triangle comprising the target corner point and any two other corner points; acquiring included angle values of the two triangles; detecting whether the included angle values are within a set value range; and determining that the target corner point is the corner point located on the target object in a case where the included angle values are within the value range.

In an embodiment, the method further includes deleting the target corner point from the plurality of corner points in a case where the included angle values are not within the value range.

According to a second aspect of the present disclosure, further provided is a virtual object construction apparatus, which includes: a first processing module configured to obtain a plurality of first planes on a target object in an environmental image according to an acquired environmental image; a second processing module configured to obtain a plurality of corner points according to the plurality of first planes; and a third processing module configured to construct a virtual object corresponding to the target object according to a corner point located on the target object in the plurality of corner points.

According to a third aspect of the present disclosure, further provided is a virtual object construction apparatus, which includes a memory configured to store a computer program and a processor configured to execute the computer program to implement the method according to the first aspect of the present disclosure.

According to a fourth aspect of the present disclosure, further provided is a computer-readable storage medium stored thereon a computer program that, when being executed by a processor, implements the method according to the first aspect of the present disclosure.

The technical solution of the embodiments of the disclosure enables the construction of a virtual object of an object, in particular, a plurality of planes on the object in an environmental image can be obtained according to the environmental image, a plurality of corner points can be obtained according to the plurality of planes, and the virtual object of the object can be constructed according to the corner points on the object in the plurality of corner points.

Other features and advantages of the embodiments of the present disclosure will become apparent from the following detailed description of exemplary embodiments of the present disclosure with reference to the accompanying drawings.

BRIEF DESCRIPTION OF THE DRAWINGS

The accompanying drawings which are incorporated in and constitute a part of the description illustrate embodiments of the present disclosure and together with the description thereof are provided to explain the principles of the embodiments of the present disclosure.

DETAILED DESCRIPTION OF THE EMBODIMENTS

Figure 1:
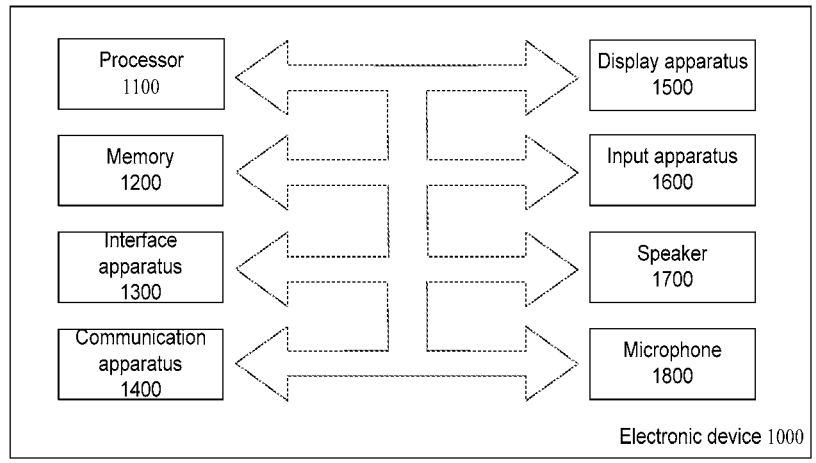
FIG. 1 is a schematic diagram of a composition structure of an electronic device capable of applying a virtual object construction method according to an embodiment of the present disclosure.

Various exemplary embodiments of the present disclosure will be described in detail with reference to the accompanying drawings. It should be noted that unless otherwise specified, the relative arrangement, numerical expressions and values of components and steps set forth in these embodiments do not limit the scope of the present invention.

The following description of at least one exemplary embodiment is in fact merely illustrative and is in no way intended to limit the present invention and its application or use.

Techniques, methods and devices known to those ordinarily skilled in the relevant art may not be discussed in detail, but where appropriate, the techniques, methods and devices should be regarded as part of the authorized description.

In all the examples shown and discussed herein, any specific value should be interpreted as exemplary only and not as a limitation. Thus, other examples of the exemplary embodiment can have different values.

It should be noted that similar reference numerals and letters denote similar items in the following figures, and therefore, once a certain item is defined in one figure, it is not necessary to further discuss it in the following figures.

An application scenario of the embodiment of the present disclosure is to construct a virtual object. Based on this, the inventor proposes a virtual object construction method, which enables the construction of a virtual object of an object, in particular, a plurality of planes on the object in an environmental image can be obtained according to the environmental image, a plurality of corner points can be obtained according to the plurality of planes, and the virtual object of the object can be constructed according to the corner points on the object in the plurality of corner points.

Hardware Configuration

FIG. 1 shows a schematic diagram of a hardware configuration of an electronic device 1000 capable of implementing the embodiments of the present invention. The electronic device 1000 may be disposed to construct a scene for virtual objects.

The electronic device 1000 may be a smart phone, a portable computer, a desktop computer, a tablet computer, a server or the like and is not limited herein.

The hardware configuration of the electronic device 1000 may include, but is not limited to, a processor 1100, a memory 1200, an interface apparatus 1300, a communication apparatus 1400, a display apparatus 1500, an input apparatus 1600, a speaker 1700, a microphone 1800, and the like. The processor 1100 may be a central processing unit CPU, a graphics processor GPU, a microprocessor MCU, or the like, configured to execute a computer program that may be written using an instruction set of an architecture such as x86, Arm, RISC, MIPS, SSE, or the like. The memory 1200 includes, for example, ROM (Read Only Memory), RAM (Random Access Memory), non-volatile memory such as a hard disk and the like. The interface apparatus 1300 includes, for example, a USB interface, a serial interface, a parallel interface and the like. The communication apparatus 1400 is capable of wired communication using optical fiber or cable, for example, or wireless communication, and in particular may include WiFi communication, Bluetooth communication, 2G/3G/4G/5G communication and the like. The display apparatus 1500 is, for example, a liquid crystal display screen, a touch display screen and the like. The input apparatus 1600 may include, for example, a touch screen, a keyboard, somatosensory input and the like. The user can input/output voice information through the speaker 1700 and the microphone 1800.

As applied in embodiments of the present disclosure, the memory 1200 of the electronic device 1000 is used to store instructions that control the processor 1100 to operate to support implementation of the virtual object construction method according to any embodiment of the present disclosure. The technician may design instructions in accordance with the solution disclosed in this disclosure. How the instructions control the processor to operate is well known in the art. Therefore, it will not be described in detail here. The electronic device 1000 may be installed with an intelligent operating system (e.g., Windows, Linux, Android, IOS, etc.) and application software.

Those skilled in the art will appreciate that while multiple apparatuses of the electronic device 1000 are shown in FIG. 1, the electronic device 1000 of embodiments of the present disclosure may relate only to some of the apparatus, for example, only to the processor 1100 and the memory 1200. This is well known in the art and will not be repeated here.

Hereinafter, various embodiments and examples according to the present invention will be described with reference to the accompanying drawings.

Method Embodiment

Figure 2:
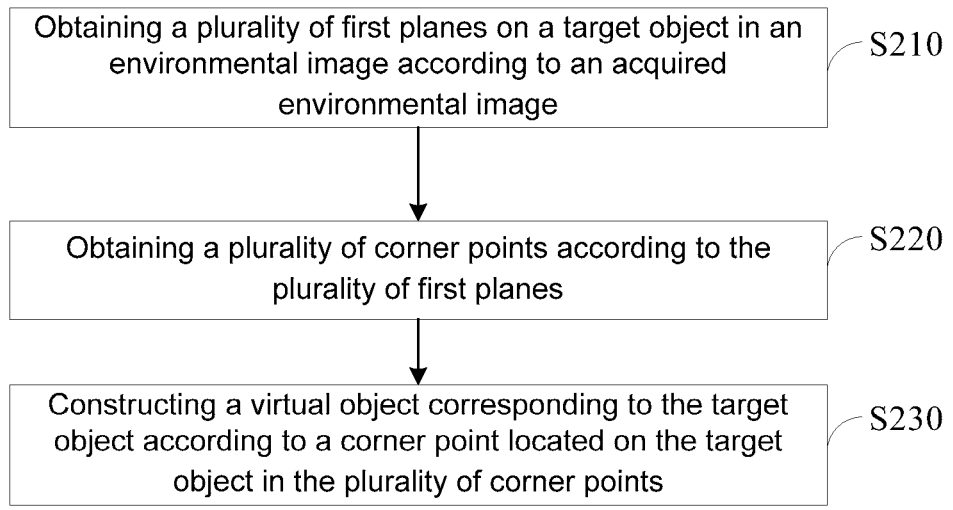
FIG. 2 is a flowchart of a virtual object construction method according to an embodiment of the present disclosure.

FIG. 2 is a flowchart of a virtual object construction method according to an embodiment. The implementation body of this embodiment is, for example, the electronic device 1000 shown in FIG. 1.

As shown in FIG. 2, the virtual object construction method of the present embodiment may include the following steps S210 to S230:

at step S210, a plurality of first planes on a target object in an environmental image are obtained according to an acquired environmental image.

In detail, the acquired environmental image may be any frame image collected by a sensor configured to capture environmental information of the physical world, that is, a physical world image within the field of view of the sensor.

In a possible implementation, the sensor may be a Monochrome camera. In this embodiment, at least two monochrome cameras can be built into one electronic device.

Given that the higher the camera resolution, the higher the reconstruction accuracy, but too high a resolution will increase the computational load, in this embodiment, the resolution of the camera can be preferably 640*480 under the comprehensive consideration of the mixed reality system using accuracy and computational load.

Given that the larger the capture range, the better it is for 3D reconstruction, however, the larger the range, the greater the optical distortion of the camera, resulting in the reconstruction accuracy more lossy. Therefore, in this embodiment, the camera capture range of the camera can preferably be about 153°*120°*167° (H*V*D) (for example, a fluctuation amount of any viewing angle value does not exceed a set value, which can be, for example, 1°, 3°, 5°, etc.). D represents a diagonal viewing angle, H represents a viewing angle in a horizontal direction, and V represents a viewing angle in a vertical direction.

Based on the above, in a possible implementation, the main configuration of the camera can be as follows: a frame rate is not less than 30 Hz, a resolution is 640*480, and a capture range is 153°*120°*167° (H*V*D).

In this embodiment, a plurality of first planes on a target object in an environmental image can be obtained according to an acquired environmental image. The target object can be any physical object with characteristics in the physical world. The plurality of first planes may constitute a surface of the target object within the field of view of the sensor.

In an embodiment of the present disclosure, in order to explain a possible implementation of obtaining a plurality of first planes according to the environmental image, at step S210, obtaining a plurality of first planes on the target object in the environmental image according to the acquired environmental image may include the following steps S2101 to S2102:

at step S2101, depth information of points on the target object in the environmental image is obtained according to the acquired environmental image.

As described above, the environmental image may be acquired by a sensor for capturing environmental information of the physical world. In this way, the environmental image can reflect a spatial relative position relationship between the sensor and other objects in a three-dimensional space environment where the sensor is located when the sensor collects the image.

In this way, according to the environmental image collected by the sensor, the depth information of any point on the target object in the environmental image can be obtained.

In an embodiment of the present disclosure, depth data calculation can be carried out on environmental image data through a computer vision technology and a stereo matching technology to obtain depth information of each area in the field of view of the sensor.

At step S2102, the plurality of first planes on the target object are obtained according to the depth information of points on the target object.

In detail, if depths of three or more points are equal under the same angle of view, these points can be considered to be on one plane, so that a plurality of planes on the object can be obtained according to the depth information of the points.

In this embodiment, the depth information of points on the target object is obtained according to the environmental image, and then a plurality of first planes on the target object are obtained accordingly.

In an embodiment of the present disclosure, in order to explain a possible implementation of obtaining a plurality of first planes according to the depth information, at step S2102, obtaining a plurality of first planes on the target object according to the depth information of points on the target object may include the following steps S21011 to S21014:

at step S21011, a plurality of second planes on the target object are acquired according to the depth information of points on the target object.

As mentioned above, the depth information of each area in the field of view of the sensor can be obtained by performing the depth data calculation on the environmental image data. Further, a plurality of plane information blocks can be extracted from the depth information of each area, that is, a plurality of second planes in this embodiment can be obtained.

In an embodiment of the present disclosure, the plane information blocks may be extracted from the depth information using a plane fitting algorithm. For example, Ransac plane fitting algorithm can be used.

At step S21012, a normal of each of the second planes is generated.

In this step, the normal of each of the acquired second planes is calculated.

At step S21013, the plurality of second planes are clustered according to the normal of each of the second planes to obtain a set number of multitype second planes In detail, the value of the set number can be set in advance.

Given that the number of second planes obtained from the depth information of points on the object is usually large, in order to reduce data processing pressure, the obtained a plurality of second planes can be clustered according to the normal of the second planes, to cluster a large number of small planes (i.e., the second planes) into a small number of large planes (i.e., the first planes). In this way, virtual objects can be constructed based on a small number of large planes instead of a large number of large planes, so as to reduce data processing pressure.

In addition, a plurality of planes on a real object are clustered according to normal constraints, and a plurality of planes on the real object should be in one category. Therefore, when constructing the virtual object according to the clustered large planes, the expected construction accuracy and effect can also be achieved.

At step S21014, the plurality of first planes on the target object are obtained according to the multitype second planes, and the multitype second planes correspond to the plurality of first planes one to one.

In this step, several classes of second planes are clustered, and several first planes with the same number can be obtained. In a possible implementation, one corresponding first plane can be obtained by combining various second planes of the same class.

As can be seen from the above, the embodiment firstly clusters a plurality of extracted small planes with a large number, and then constructs a virtual object by using a plurality of large planes with a small number obtained by clustering, so as to ensure the construction effect and reduce the data processing pressure as much as possible.

Based on different practical application requirements, in other embodiments of the present disclosure, the virtual object can also be constructed directly using a large number of extracted small planes. Thus, the plurality of plane information blocks are extracted from the depth information of each area to obtain the plurality of first planes in this embodiment. The construction accuracy corresponding to the virtual object constructed by the large planes can be less than or approximate to the construction accuracy corresponding to the virtual object constructed by the small planes, which is subject to meeting the accuracy requirements.

Based on the above contents, in an embodiment of the present disclosure, in order to explain a possible implementation of clustering the second planes according to the plane normal, at step S21013, clustering the plurality of second planes according to the normal of each of the second planes to obtain a set number of multitype second planes may include the following steps S210131 to S210137:

at step S210131, a set number of a plurality of first clustering centers are acquired, the plurality of first clustering centers are a plurality of lines.

In this embodiment, the clustering processing is performed according to the normal of the second plane, so that one clustering center can be a line.

In a possible implementation, the plurality of first clustering centers may be randomly selected from the normal of the plurality of second planes. In other possible implementations, the plurality of first clustering centers may also be a plurality of arbitrary lines.

At step S210132, for each of the second plane, clustering values of the second plane and each of the first clustering centers are calculated correspondingly according to a relative position relationship between the normal of the second plane and each of the first clustering centers, and the second plane is classified into the first clustering center with the largest clustering value.

In detail, in the 3D physical world, different lines have different spatial positions, and there is a certain spatial position relationship between different lines, such as an included angle. In this embodiment, the included angle between two parallel lines can be 0°. In this embodiment, the smaller the included angle between the two lines, the easier it is to classify the second planes corresponding to the two lines into the same class.

Thus, the relative positional relationship may include an included angle, which is negatively correlated with the corresponding clustering value. Therefore, if the angle between the normal of the second plane and the first clustering center is smaller, the clustering value of the second plane and the first clustering center is larger, and the second plane is easier to be classified into the first clustering center. In this way, the obtained plurality of second planes can be classified into multitype second planes.

At step S210133, for each of the first clustering centers, weighted average processing is performed on the normal of each of the second planes classified to the first clustering center, and a line obtained by processing is used as a corresponding second clustering center.

In detail, under the condition of good clustering effect, the line (i.e., the second clustering center) obtained by weighting the normal of each of the second planes in the same class of second planes should be parallel to the corresponding first clustering center, otherwise, the current clustering effect can be considered to be poor, and clustering can be carried out again, and this is repeated until a better clustering effect is achieved.

At step S210134, a similarity between the first clustering center and the corresponding second clustering center is generated.

Based on the above contents, in this step, the similarity between the first clustering center and the corresponding second clustering center can be calculated. The angle between them can be negatively correlated with the similarity.

At step S210135, the similarity is compared with a set similarity threshold.

At step S210136, each of obtained second clustering centers is used as a corresponding first clustering center in a case where any generated similarity is less than the similarity threshold, and the step of calculating the clustering value of the second plane and each of the first clustering centers is executed.

In this step, the similarity does not meet the requirements, so the clustering processing can be performed again based on a new clustering center.

At step S210137, respective second planes classified into the same first clustering center are used as one-type second planes in a case where each of the generated similarities is not less than the similarity threshold, to obtain the set number of multitype second planes.

In this step, the similarity meets the requirements, and the clustering processing ends to obtain the multitype second planes. The second planes of the same class can form one corresponding first plane.

At step S220, a plurality of corner points are obtained according to the plurality of first planes obtained in step S210.

In this step, since the first plane is on the target object, the obtained corner points are related to the target object (for example, the obtained corner points include the corner points located on the target object), so a virtual object of the target object can be constructed according to the obtained corner points.

In an embodiment of the present disclosure, in order to explain a possible implementation of obtaining a plurality of corner points from a plurality of first planes, at step S220, obtaining a plurality of corner points from the plurality of first planes may include the following steps S2201 to S2202:

at step S2201, for any two first planes in the plurality of first planes, an intersection line of the two first planes in an infinitely extended state is acquired.

In this step, for a plurality of planes on a real object, any two planes are selected, and the two planes are infinitely extended to obtain a boundary line where the two planes intersect (i.e., the intersection line).

At step S2202, an intersection point of other first planes and the intersection line is used as one corner point to obtain a plurality of corner points, for any other first plane in the plurality of first planes intersecting the intersection line in the infinitely extended state.

In this step, any plane in other planes that can intersect with the boundary line is obtained, and the plane intersects with the boundary line, so that 3D corner point information at the intersection can be obtained according to certain rules, that is, a corner point can be obtained.

In this way, a plurality of corner points can be obtained. After the plurality of corner points are obtained, the following step S230 can be executed.

At step S230, a virtual object corresponding to the target object is constructed according to a corner point located on the target object in the plurality of corner points.

As described above, the corner points are obtained by infinite extension of a plane, and therefore, in the obtained corner points, there are both corner points located on the target object and corner points not located on the target object. Therefore, in this embodiment, the corresponding virtual object can be constructed directly according to the corner points located on the target object.

Compared with the implementation of directly using all the obtained corner points to construct virtual objects, and then trimming the constructed virtual object, the embodiment of the present disclosure only utilizes the corner points located on the target object to construct the virtual object, which can not only reduce the data quantity pressure of model construction, but also omit the operation steps of subsequent trimming processing.

In detail, it is possible to judge whether the 3D corner points generated on the physical real object form a closure through the 3D corner point feature information of the physical real object, so as to determine whether the corner point is on the object. For example, it can be determined whether the boundary lines of a plurality of corner points can be connected to a surface that connects and binds a closed volume. If there is a corner point that does not connect and bind the surface of a closed body, it is deleted from the 3D corner point set corresponding to the object. Finally, the corresponding virtual objects are constructed based on the remaining corner points in the 3D corner point set.

Based on the above, in an embodiment of the present disclosure, the method may further include the following steps A1 to A5 before constructing a virtual object corresponding to the target object according to a corner point located on the target object in the plurality of corner points at step S230:

at step A1, three other corner points relatively closer to the target corner point in the plurality of corner points are acquired by using any corner point in the plurality of corner points as a target corner point.

For example, a corner point A is used as a target corner point, and the other three corner points (i.e., corner point B, corner point C and corner point D) that are relatively closest to the corner point A are obtained.

At step A2, two triangles are obtained according to the target corner point and the three other corner points, three vertices of the triangle include the target corner point and any two other corner points.

For example, these two triangles can be △ABC and △ABD.

At step A3, included angle values of the two triangles are acquired.

The included angle value is not more than 180°. If the two triangles can form a plane, an angle between the two triangles may be 180° or 0°.

At step A4, whether the included angle values are within a set value range is detected.

For example, if the angle between two triangles is 90°, which falls within the set value range.

At step A5, it is determined that the target corner point is the corner point located on the target object in a case where the included angle values are within the value range.

In this embodiment, when the included angle value is within the value range, the target corner point can be considered to be on the target object, so that the target corner point in the corner point set can be retained.

In this embodiment, after respective corner points are obtained, a triangle can be constructed based on the corner points, and one triangle is one plane. Since two adjacent planes on a real object should be close to forming a plane, if adjacent triangles are close to forming a plane, it means that the corresponding corner points are on the object, otherwise, it means that the corresponding corner points are not on the object.

Based on the above, in an embodiment of the present disclosure, the method may further include the following step A6:

at step A6, the target corner point is deleted from the plurality of corner points in a case where the included angle value is not within the value range.

In this embodiment, after step A4, step A5 or step A6 are executed according to a detection result.

In this embodiment, when the included angle value is not within the value range, the target corner point can be considered to be not on the target object, so that the target corner point can be deleted from the corner point set. In this way, after detection of each corner point in the corner point set is completed, the virtual object can be constructed based on the remaining corner points in the corner point set.

Based on the above, it is possible to check whether each corner point in the plurality of corner points is on the target object sequentially. In this way, the deleted corner point can be removed from a check operation of other corner points, thereby improving the data processing efficiency.

In an embodiment of the present disclosure, the corner points located on the target object can be triangulated according to 3D Mesh rules to construct the virtual object corresponding to the target object.

In detail, each triangle determines one plane, and each triangle has edges connecting points on a surface of an object in the real physical world, so each triangle can represent a part of the surface.

In the embodiment, the virtual object of the target object can be constructed by triangulating the obtained corner points on the target object.

In addition, in an embodiment of the present disclosure, for each triangle obtained by triangulation, object attribute information of the triangle can also be stored according to a set data storage rule.

The object attribute information may include color, texture and other information. By combining the physical attribute information of objects, virtual objects with corresponding attribute characteristics can be constructed.

In a possible implementation, the object attribute information of any triangle can be determined according to the object attribute of the triangle on the object in the environmental image. In other possible implementations, the object attribute information can also be customized.

Thus, according to the virtual object construction method provided by the embodiments of the present disclosure, a plurality of first planes on objects in the environmental image can be obtained according to the environmental image, then a plurality of corner points are obtained according to the plurality of first planes, and then a virtual object of the object is constructed according to the corner points on the object in the plurality of corner points, thereby completing the construction of the virtual object of the object.

Furthermore, the constructed virtual object can be used for 3D world reconstruction. The embodiments of the present disclosure reconstruct the physical world environment into a digital environment through computer vision technology, and the reconstructed 3D world can be applied to an extended reality (XR) environment, such as a virtual reality (VR) environment, an augmented reality (AR) environment, and a mixed reality (MR) environment. As such, some or all of the environmental information in an extended reality environment may be generated by a computer using data describing the environment. Then the user can experience the virtual objects in the extended reality environment when the created extended reality environment is presented to the user through the human user interface of the related electronic device.

In this embodiment, the related electronic device may include a virtual reality head-mounted integrated device, an augmented reality integrated device, a mixed reality integrated device and the like.

The virtual object construction method provided by the embodiment of the present disclosure can be applied to the extended reality environment, and further can be applied to a plurality of application fields, such as scientific visualization, medical training, engineering design and prototyping, telecommuting operation, personal entertainment and the like. Furthermore, unlike virtual reality, augmented reality systems and hybrid reality include one or more virtual objects associated with real objects of the physical world. The interactive experience between virtual objects and real objects greatly enhances the fun of users using extended reality systems, and at the same time opens the door for various application environments. Through the interactive combination of virtual and real objects, users can better understand the fun of some key data in the real physical world.

Figure 3:
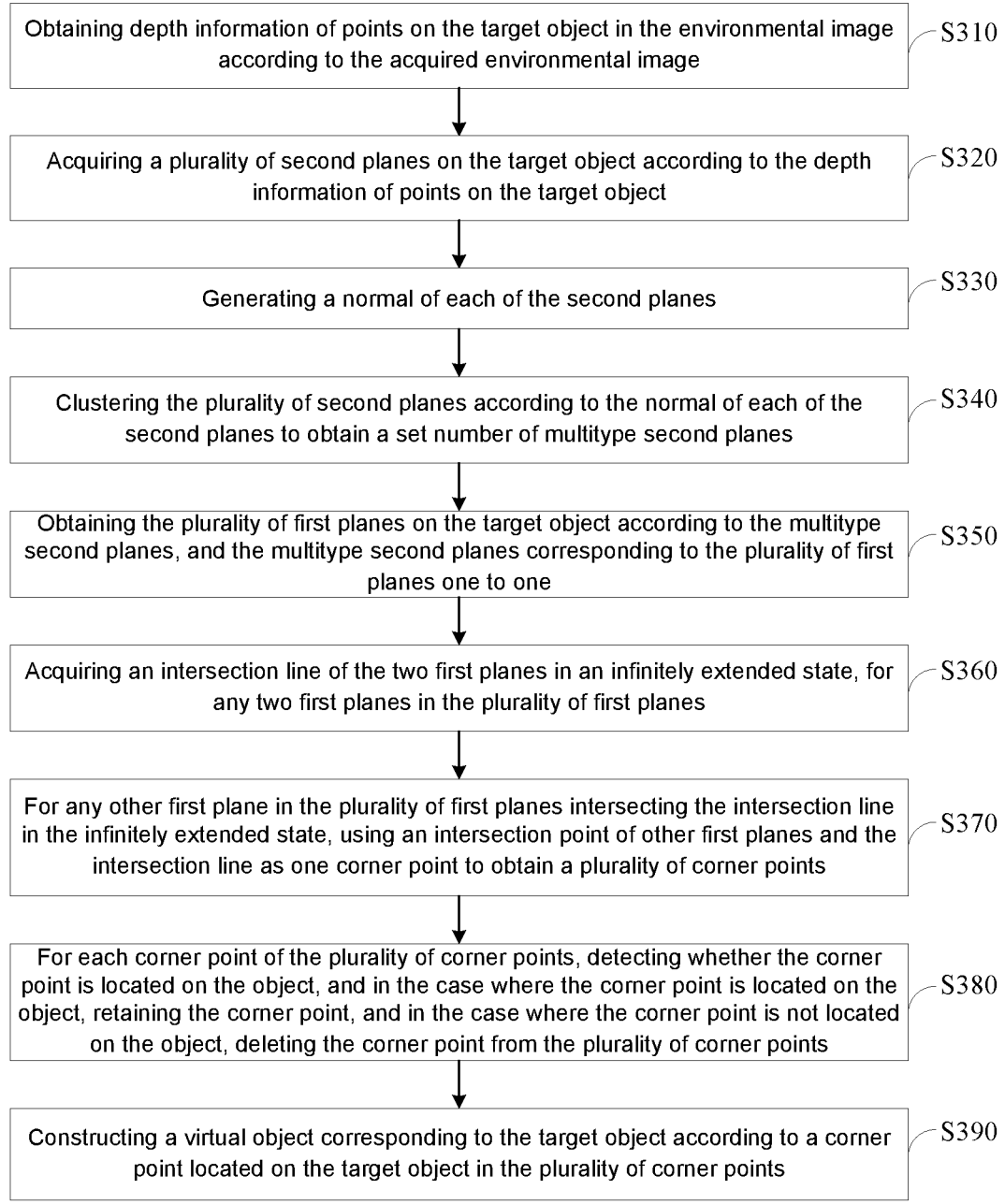
FIG. 3 is a flowchart of a virtual object construction method according to another embodiment.

FIG. 3 is a flowchart of a virtual object construction method according to an embodiment. The implementation body of this embodiment is, for example, the electronic device 1000 shown in FIG. 1.

As shown in FIG. 3, the method of this embodiment may include the following steps S310 to S390:

at step S310, depth information of points on the target object in the environmental image is obtained according to the acquired environmental image.

At step S320, a plurality of second planes on the target object are acquired according to the depth information of points on the target object.

At step S330, a normal of each of the second planes is generated.

At step S340, the plurality of second planes are clustered according to the normal of each of the second planes to obtain a set number of multitype second planes In this embodiment, the specific implementation process of clustering a plurality of obtained second planes according to the normal of the second plane can refer to the above contents, which will not be repeated here in this embodiment.

At step S350, the plurality of first planes on the target object are obtained according to the multitype second planes, and the multitype second planes correspond to the plurality of first planes one to one.

At step S360, for any two first planes in the plurality of first planes, an intersection line of the two first planes in an infinitely extended state is acquired.

At step S370, an intersection point of other first planes and the intersection line is used as one corner point to obtain a plurality of corner points, for any other first plane in the plurality of first planes intersecting the intersection line in the infinitely extended state.

At step S380, for each corner point of the plurality of corner points, whether the corner point is located on the object is detected, and in the case where the corner point is located on the object, the corner point is retained, and in the case where the corner point is not located on the object, the corner point is deleted from the plurality of corner points.

In this embodiment, the specific detection method of whether a corner point is on the object or not can refer to the above contents, and will not be repeated here in this embodiment.

At step S390, a virtual object corresponding to the target object is constructed according to a corner point located on the target object in the plurality of corner points.

In the embodiment, the retained corner point of the plurality of corner points is the corner point located on the target object, and the virtual object of the target object can be constructed according to the corner point on the target object.

In the extended reality system, the reconstruction of 3D physical world requires more system computing resources, and according to the virtual object construction method provided by the embodiment of the present disclosure, a plurality of small planes on the object in the environmental image can be obtained according to the environmental image, and after getting the small planes, the plurality of small planes are clustered into a large plane to get a plurality of large planes with a smaller number firstly, and then a plurality of corner points are obtained according to the plurality of large planes, and further, the corner points that are not on the object are filtered out from the plurality of corner points, so as to construct the virtual object of the object according to the corner points on the object only, to complete the construction of the virtual object of the object. Based on this, the virtual object construction method can at least have the characteristics of short processing time, less occupation of computing resources and high utilization rate of storage space, thus reducing the requirement and dependence on computing resources, thereby reducing the dependence on hardware computing resources of the extended reality system. For example, it can be set as a conventional computing platform.

Device Embodiment

Figure 4:
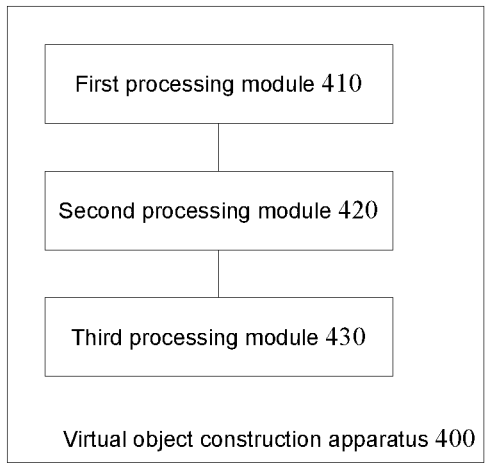
FIG. 4 is a block schematic diagram of a virtual object construction apparatus according to an embodiment of the present disclosure.

FIG. 4 is a schematic block diagram of a virtual object construction apparatus 400 according to an embodiment. As shown in FIG. 4, the virtual object construction apparatus 400 may include a first processing module 410, a second processing module 420 and a third processing module 430. The virtual object construction apparatus 400 may be or include the electronic apparatus 1000 shown in FIG. 1.

The first processing module 410 obtains a plurality of first planes on a target object in an environmental image according to an acquired environmental image. The second processing module 420 obtains a plurality of corner points according to the plurality of first planes. The third processing module 430 constructs a virtual object corresponding to the target object according to a corner point located on the target object in the plurality of corner points.

In an embodiment of the present disclosure, the first processing module 410 obtains depth information of points on the target object in the environmental image according to the acquired environmental image; and obtains the plurality of first planes on the target object according to the depth information of points on the target object.

In an embodiment of the present disclosure, the first processing module 410 acquires a plurality of second planes on the target object according to the depth information of points on the target object; generates a normal of each of the second planes; clusters the plurality of second planes according to the normal of each of the second planes to obtain a set number of multitype second planes; and obtains the plurality of first planes on the target object according to the multitype second planes, and the multitype second planes corresponding to the plurality of first planes one to one.

In an embodiment of the present disclosure, the first processing module 410 acquires a set number of a plurality of first clustering centers, the plurality of first clustering centers being a plurality of lines; calculates, for each of the second plane, clustering values of the second plane and each of the first clustering centers correspondingly according to a relative position relationship between the normal of the second plane and each of the first clustering centers, and classifies the second plane into the first clustering center with the largest clustering value; performs weighted average processing, for each of the first clustering centers, on the normal of each of the second planes classified to the first clustering center, and uses a line obtained by the processing as a corresponding second clustering center; generates a similarity between the first clustering center and the corresponding second clustering center; compares the similarity with a set similarity threshold; uses each of obtained second clustering centers as a corresponding first clustering center in a case where any generated similarity is less than the similarity threshold, and executes the step of calculating the clustering value of the second plane and each of the first clustering centers; and uses respective second planes classified into the same first clustering center as one-type second planes in a case where each of the generated similarities is not less than the similarity threshold, to obtain the set number of multitype second planes.

In an embodiment of the present disclosure, the second processing module 420 acquires an intersection line of the two first planes in an infinitely extended state, for any two first planes in the plurality of first planes; and uses an intersection point of other first planes and the intersection line as one corner point to obtain a plurality of corner points, for any other first plane in the plurality of first planes intersecting the intersection line in the infinitely extended state.

In an embodiment of the present disclosure, the virtual object construction apparatus 400 further includes a fourth processing module. Before the third processing module 430 constructs the virtual object corresponding to the target object, the fourth processing module acquires three other corner points relatively closer to the target corner point in the plurality of corner points by using any corner point in the plurality of corner points as a target corner point; and obtains two triangles according to the target corner point and the three other corner points, three vertices of the triangle comprising the target corner point and any two other corner points; acquires included angle values of the two triangles; detects whether the included angle values are within a set value range; and determines that the target corner point is the corner point located on the target object in a case where the included angle values are within the value range.

In an embodiment of the present disclosure, the fourth processing module deletes the target corner point from the plurality of corner points in a case where the included angle values are not within the value range.

Figure 5:
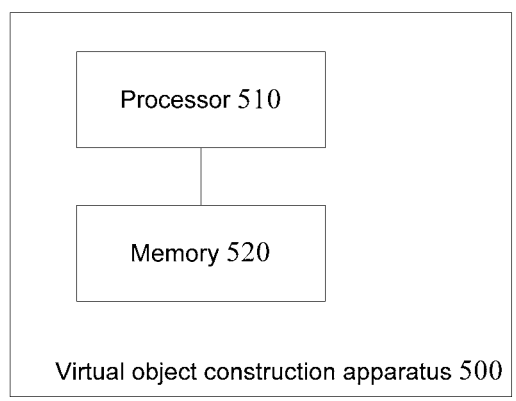
FIG. 5 is a schematic diagram of a hardware structure of the virtual object construction apparatus according to an embodiment of the present disclosure.

FIG. 5 is a schematic diagram of a hardware structure of the virtual object construction apparatus 500 according to an embodiment. The virtual object construction apparatus 500 may be or include the electronic apparatus 1000 shown in FIG. 1.

As shown in FIG. 5, the virtual object construction apparatus 500 includes a processor 510 and a memory 520. The memory 520 is configured to store an executable computer program, the processor 510 is configured to execute the method of any of the above method implementations according to control of the computer program.

Each module of the above virtual object construction apparatus 500 may be implemented by the processor 510 executing the computer program stored in the memory 520 in this embodiment or by other circuit structures, which is not limited herein.

In addition, the embodiments of the present disclosure also provide a computer-readable storage medium stored thereon a computer program that, when being executed by a processor, implements the method of any of the above method embodiments.

The present invention may be a system, method, and/or computer program product. The computer program product may include a computer-readable storage medium loaded with a computer-readable program instruction thereon provided for enabling a processor to implement aspects of the present invention.

The computer-readable storage medium may be a tangible device that may hold and store instructions used by an instruction executing device. The computer-readable storage medium may be, for example, but is not limited to, an electrical storage device, a magnetic storage device, an optical storage device, an electromagnetic storage device, a semiconductor storage device, or any suitable combination of the above. More specific examples (non-exhaustive list) of computer-readable storage media include: portable computer disk, hard disk, Random Access Memory (RAM), Read-Only Memory (ROM), Erasable Programmable Read-Only Memory (EPROM or flash memory), Static Random Access Memory (SRAM), Portable Compact Disk Read-Only Memory (CD-ROM), Digital Versatile Disk (DVD), memory stick, floppy disk, mechanical encoding device, such as punched cards or grooved bumps on which instructions are stored, and any suitable combination of the above. The computer-readable storage media used herein are not interpreted as transient signals themselves, such as radio waves or other freely propagating electromagnetic waves, electromagnetic waves propagating through waveguides or other transmission media (e.g., optical pulses through fiber optic cables), or electrical signals transmitted through wires.

The computer-readable program instructions described herein may be downloaded from a computer-readable storage medium to individual computing/processing devices, or to an external computer or external storage device over a network, such as the Internet, a local area network, a wide area network, and/or a wireless network. The network may include copper transmission cables, fiber optic transmissions, wireless transmissions, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions provided for executing the operations of the present invention may be assembly instructions, instruction set architecture (ISA) instructions, machine instructions, machine-related instructions, microcode, firmware instructions, state setting data, or source code or object code written in any combination of one or more programming languages. The programming languages include object-oriented programming languages such as Smalltalk, C++, etc. and conventional procedural programming languages such as the "C" language or similar programming languages. Computer-readable program instructions may be executed entirely on the user's computer, partly on the user's computer, as an independent software package, partly on the user's computer and partly on a remote computer, or entirely on a remote computer or server. In the case of the remote computer, the remote computer may be connected to the user computer over any kind of network, including a local area network (LAN) or a wide area network (WAN), or may be connected to an external computer (e.g., via the Internet using an Internet service provider). In some embodiments, various aspects of the present invention are implemented by personalizing an electronic circuit, such as a programmable logic circuit, a field programmable gate array (FPGA), or a programmable logic array (PLA), using state information of the computer-readable program instructions executable by the electronic circuit.

Various aspects of the present invention are described herein with reference to flowcharts and/or block diagrams of the methods, apparatus (systems) and computer program products according to embodiments of the invention. It should be understood that each block of the flowchart and/or block diagrams and combinations of the blocks in the flowchart and/or block diagrams may be implemented by the computer-readable program instructions.

These computer-readable program instructions may be provided to a processor of a general purpose computer, a special purpose computer, or other programmable data processing device, thereby producing a machine such that the instructions, when executed by a processor of a computer or other programmable data processing device, produce apparatuses for carrying out the functions/actions specified in one or more blocks in the flowchart and/or block diagram. These computer-readable program instructions may also be stored in a computer-readable storage medium, the instructions cause computers, programmable data processing apparatus, and/or other devices to operate in a specific manner, such that the computer-readable medium in which the instructions are stored includes an article of manufacture including instructions for implementing various aspects of the functions/actions specified in one or more blocks in the flowchart and/or block diagram.

The computer-readable program instructions may also be loaded onto computers, other programmable data processing apparatuses, or other devices, such that a series of operating steps are executed on a computer, other programmable data processing apparatus, or other devices to produce a computer-implemented process such that instructions executed on the computer, other programmable data processing apparatus, or other devices implement the functions/actions specified in one or more blocks in the flowchart and/or block diagram.

The flowcharts and block diagrams in the accompanying drawings illustrate possible implementations of architectures, functions and operations of systems, methods and computer program products according to various embodiments of the present invention. In this regard, each block in a flowchart or block diagram may represent a module, program segment, or part of an instruction containing one or more executable instructions provided for implementing a specified logical function. In some alternative implementations, the functions indicated in the boxes may also occur in a different order than those indicated in the drawings. For example, two successive boxes can actually be executed substantially in parallel, or they can sometimes be executed in a reverse order, depending on the functionality involved.

It is also noted that each block in the block diagram and/or flowchart, and combinations of the blocks in the block diagram and/or flowchart, may be implemented in a dedicated hardware-based system that executes a specified function or action, or may be implemented in a combination of dedicated hardware and computer instructions. It is well known to those skilled in the art that the implementation by hardware, the implementation by software and the implementation by a combination of software and hardware are all equivalent.

Embodiments of the present invention have been described above, and the above description is exemplary not exhaustive and is not limited to the disclosed embodiments. Many modifications and changes will be apparent to those of ordinary skill in the art without departing from the scope and spirit of the illustrated embodiments. The terminology used herein was chosen to best explain the principles of the embodiments, the practical application or technical improvement over technologies found in the marketplace, or to enable others of ordinary skill in the art to understand the embodiments disclosed herein. The scope of the present invention is limited by the appended claims.

What is claimed is:

1. A virtual object construction method, comprising:
obtaining a plurality of first planes on a target object in an environmental image according to an acquired environmental image;
obtaining a plurality of corner points according to the plurality of first planes;
constructing a virtual object corresponding to the target object according to a corner point located on the target object in the plurality of corner points;
wherein the obtaining a plurality of corner points according to the plurality of first planes comprises:
acquiring an intersection line of two non-parallel first planes in an infinitely extended state, for any two non-parallel first planes in the plurality of first planes; and
using an intersection point formed by intersection of other first planes and the intersection line of the two non-parallel first planes as a corner point, for any other first plane in the plurality of first planes intersecting the intersection line in the infinitely extended state.

2. The virtual object construction method of claim 1, wherein the obtaining a plurality of first planes on a target object in an environmental image according to an acquired environmental image comprises:
obtaining depth information of points on the target object in the environmental image according to the acquired environmental image; and
obtaining the plurality of first planes on the target object according to the depth information of points on the target object.

3. The virtual object construction method of claim 2, wherein the obtaining depth information of the points on the target object in the environmental image according to the acquired environmental image comprises:
obtaining depth information of points on the target object in the environmental image by performing depth data calculation on the environmental data through a computer vision technology and a stereo matching technology.

4. The virtual object construction method of claim 2, wherein the obtaining the plurality of first planes on the target object according to the depth information of points on the target object comprises:

acquiring a plurality of second planes on the target object according to the depth information of points on the target object;

generating a normal of each of the second planes;

clustering the plurality of second planes according to the normal of each of the second planes to obtain a plurality of clusters, wherein each cluster contains at least one second plane, a number of the plurality of clusters is a set number;

obtaining the plurality of first planes on the target object according to the multitype second planes, the multitype second planes corresponding to the plurality of first planes one to one.

5. The virtual object construction method of claim 4, wherein the clustering the plurality of second planes according to the normal of each of the second planes to obtain a set number of multitype second planes comprises:

acquiring a set number of first clustering centers, the plurality of first clustering centers being features of a plurality of lines;

calculating, for each of the second plane, clustering values of the second plane and each of the first clustering centers correspondingly according to a relative position relationship between the normal of the second plane and each of the first clustering centers, and classifying the second plane into the first clustering center with the largest clustering value;

performing weighted average processing, for each of the first clustering centers, on the normal of each of the second planes classified to the first clustering center, and using a line obtained by the processing as a corresponding second clustering center;

generating a similarity between the first clustering center and the corresponding second clustering center;

comparing the similarity with a set similarity threshold;

using each of obtained second clustering centers as a corresponding first clustering center in a case where any generated similarity is less than the similarity threshold, and executing the step of calculating the clustering value of the second plane and each of the first clustering centers; and classifying each of the plurality of second plane clustered to a same first clustering center to a same cluster in a case where each of the generated similarities is not less than the similarity threshold, to obtain the plurality of clusters.

6. The virtual object construction method of claim 1, wherein before the constructing a virtual object corresponding to the target object, the method further comprises:

using any corner point in the plurality of corner points as a target corner point;

acquiring three other corner points in the plurality of corner points, wherein the three other corner points are relatively closer to the target corner point than a corner point other than the three other corner points and the target corner point in the plurality of corner points obtaining two triangles according to the target corner point and the three other corner points, three vertices of each of the two triangle comprising the target corner point and any two corner points of the three other corner points;

acquiring angle values between a plane where one of the two triangles is located and a plane where another one of the two triangles is located;

detecting whether the angle values are within a set value range; and determining that the target corner point is the corner point located on the target object in a case where the angle values are within the value range.

7. The virtual object construction method of claim 6, wherein the method further comprises deleting the target corner point from the plurality of corner points in a case where the included angle values are not within the value range.

8. A virtual object construction apparatus, comprising:

a memory configured to store a computer program; and a processor configured to execute the computer program to:

obtain a plurality of first planes on a target object in an environmental image according to an acquired environmental image;

obtain a plurality of corner points according to the plurality of first planes; and construct a virtual object corresponding to the target object according to a corner point located on the target object in the plurality of corner points;

wherein the obtain a plurality of corner points according to the plurality of first planes comprises:

acquire an intersection line of two non-parallel first planes in an infinitely extended state, for any two non-parallel first planes in the plurality of first planes; and use an intersection point formed by intersection of other first planes and the intersection line of the two non-parallel first planes as a corner point, for any other first plane in the plurality of first planes intersecting the intersection line in the infinitely extended state.

9. The virtual object construction apparatus of claim 8, the processor is further configured to:

obtain depth information of points on the target object in the environmental image according to the acquired environmental image; and obtain the plurality of first planes on the target object according to the depth information of points on the target object.

10. The virtual object construction apparatus of claim 9, the processor is further configured to:

obtain depth information of points on the target object in the environmental image by performing depth data calculation on the environmental data through a computer vision technology and a stereo matching technology.

11. The virtual object construction apparatus of claim 9, the processor is further configured to:

acquire a plurality of second planes on the target object according to the depth information of points on the target object;

generate a normal of each of the second planes;

cluster the plurality of second planes according to the normal of each of the second planes to obtain a plurality of clusters, wherein each cluster contains at least one second plane, a number of the plurality of clusters is a set number;

obtain the plurality of first planes on the target object according to the multitype second planes, the multitype second planes corresponding to the plurality of first planes one to one.

12. The virtual object construction apparatus of claim 11, the processor is further configured to:

acquire a set number of first clustering centers, the plurality of first clustering centers being features of a plurality of lines;

calculate, for each of the second plane, clustering values of the second plane and each of the first clustering centers correspondingly according to a relative position relationship between the normal of the second plane and each of the first clustering centers, and classifying the second plane into the first clustering center with the largest clustering value;

perform weighted average processing, for each of the first clustering centers, on the normal of each of the second planes classified to the first clustering center, and using a line obtained by the processing as a corresponding second clustering center;

generate a similarity between the first clustering center and the corresponding second clustering center;

compare the similarity with a set similarity threshold;

use each of obtained second clustering centers as a corresponding first clustering center in a case where any generated similarity is less than the similarity threshold, and executing the step of calculating the clustering value of the second plane and each of the first clustering centers; and classify each of the plurality of second plane clustered to a same first clustering center to a same cluster in a case where each of the generated similarities is not less than the similarity threshold, to obtain the plurality of clusters.

13. The virtual object construction apparatus of claim 9, the processor is further configured to:

use any corner point in the plurality of corner points as a target corner point;

acquire three other corner points in the plurality of corner points, wherein the three other corner points are relatively closer to the target corner point than a corner point other than the three other corner points and the target corner point in the plurality of corner points obtain two triangles according to the target corner point and the three other corner points, three vertices of each of the two triangle comprising the target corner point and any two corner points of the three other corner points;

acquire angle values between a plane where one of the two triangles is located and a plane where another one of the two triangles is located;

detect whether the angle values are within a set value range; and determine that the target corner point is the corner point located on the target object in a case where the angle values are within the value range.

14. The virtual object construction apparatus of claim 13, the processor is further configured to:

delete the target corner point from the plurality of corner points in a case where the included angle values are not within the value range.

15. A non-transitory computer-readable storage medium, a computer program is stored in the computer-readable storage medium, when the computer program is executed by a processor, performs the following operations:

obtain a plurality of first planes on a target object in an environmental image according to an acquired environmental image;

obtain a plurality of corner points according to the plurality of first planes; and construct a virtual object corresponding to the target object according to a corner point located on the target object in the plurality of corner points;

wherein the obtain a plurality of corner points according to the plurality of first planes comprises:

acquire an intersection line of two non-parallel first planes in an infinitely extended state, for any two non-parallel first planes in the plurality of first planes; and use an intersection point formed by intersection of other first planes and the intersection line of the two non-parallel first planes as a corner point, for any other first plane in the plurality of first planes intersecting the intersection line in the infinitely extended state.

16. The non-transitory computer-readable storage medium of claim 15, when the computer program is executed by the processor, further performs the following operations:

use any corner point in the plurality of corner points as a target corner point;

acquire three other corner points in the plurality of corner points, wherein the three other corner points are relatively closer to the target corner point than a corner point other than the three other corner points and the target corner point in the plurality of corner points;

obtain two triangles according to the target corner point and the three other corner points, three vertices of each of the two triangle comprising the target corner point and any two corner points of the three other corner points;

acquire angle values between a plane where one of the two triangles is located and a plane where another one of the two triangles is located;

detect whether the angle values are within a set value range; and determine that the target corner point is the corner point located on the target object in a case where the angle values are within the value range.

17. The non-transitory computer-readable storage medium of claim 15, when the computer program is executed by the processor, further performs the following operations:

delete the target corner point from the plurality of corner points in a case where the included angle values are not within the value range.

* * * * *